(12) United States Patent
Kim et al.

(10) Patent No.: US 10,260,881 B2
(45) Date of Patent: Apr. 16, 2019

(54) HOLLOW CORE FIBER PIGTAIL SYSTEM AND METHOD

(71) Applicants: Steven Kim, Santa Clarita, CA (US); Ricardo A. Rosete, Syracuse, UT (US); Ragini Saxena, Simi Valley, CA (US)

(72) Inventors: Steven Kim, Santa Clarita, CA (US); Ricardo A. Rosete, Syracuse, UT (US); Ragini Saxena, Simi Valley, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/608,379

(22) Filed: May 30, 2017

(65) Prior Publication Data
US 2018/0347986 A1 Dec. 6, 2018

(51) Int. Cl.
| | | |
|---|---|---|
| G02B 6/02 | (2006.01) | |
| G02B 6/30 | (2006.01) | |
| G02B 6/38 | (2006.01) | |
| G01C 19/72 | (2006.01) | |
| G02B 6/122 | (2006.01) | |
| G02B 6/126 | (2006.01) | |

(52) U.S. Cl.
CPC .......... *G01C 19/722* (2013.01); *G01C 19/72* (2013.01); *G02B 6/02361* (2013.01); *G02B 6/122* (2013.01); *G02B 6/126* (2013.01); *G02B 6/30* (2013.01); *G02B 6/02328* (2013.01); *G02B 6/3822* (2013.01)

(58) Field of Classification Search
None
See application file for complete search history.

(56) References Cited

U.S. PATENT DOCUMENTS

| | | | |
|---|---|---|---|
| 6,625,376 B2 | 9/2003 | Werkheiser et al. | |
| 7,697,143 B2 | 4/2010 | Sanders et al. | |
| 8,422,024 B2 | 4/2013 | Sanders et al. | |
| 8,427,651 B2 | 4/2013 | Digonnet | |
| 2009/0296098 A1* | 12/2009 | Sanders | G01C 19/722 356/461 |
| 2012/0261050 A1* | 10/2012 | Lindner | B32B 37/02 156/64 |
| 2015/0022818 A1* | 1/2015 | Lloyd | G01C 19/721 356/460 |

FOREIGN PATENT DOCUMENTS

| | | |
|---|---|---|
| EP | 2128566 A2 | 12/2009 |
| GB | 2239102 A | 6/1991 |
| WO | 2004/111695 A1 | 12/2004 |

OTHER PUBLICATIONS

Partial European Search Report corresponding to European Application No. EP18173050, dated Sep. 28, 2018.

* cited by examiner

*Primary Examiner* — Shawn Decenzo
(74) *Attorney, Agent, or Firm* — Tarolli, Sundheim, Covell & Tummino LLP

(57) ABSTRACT

An interface for a hollow core fiber is provided that facilitates the direct pigtailing of the hollow core fiber to a port on an electro-optic device. The interface includes an angled face that attaches to the electronic device at an angle that minimizes optical power loss as light propagates from the electronic device to the hollow core fiber.

20 Claims, 9 Drawing Sheets

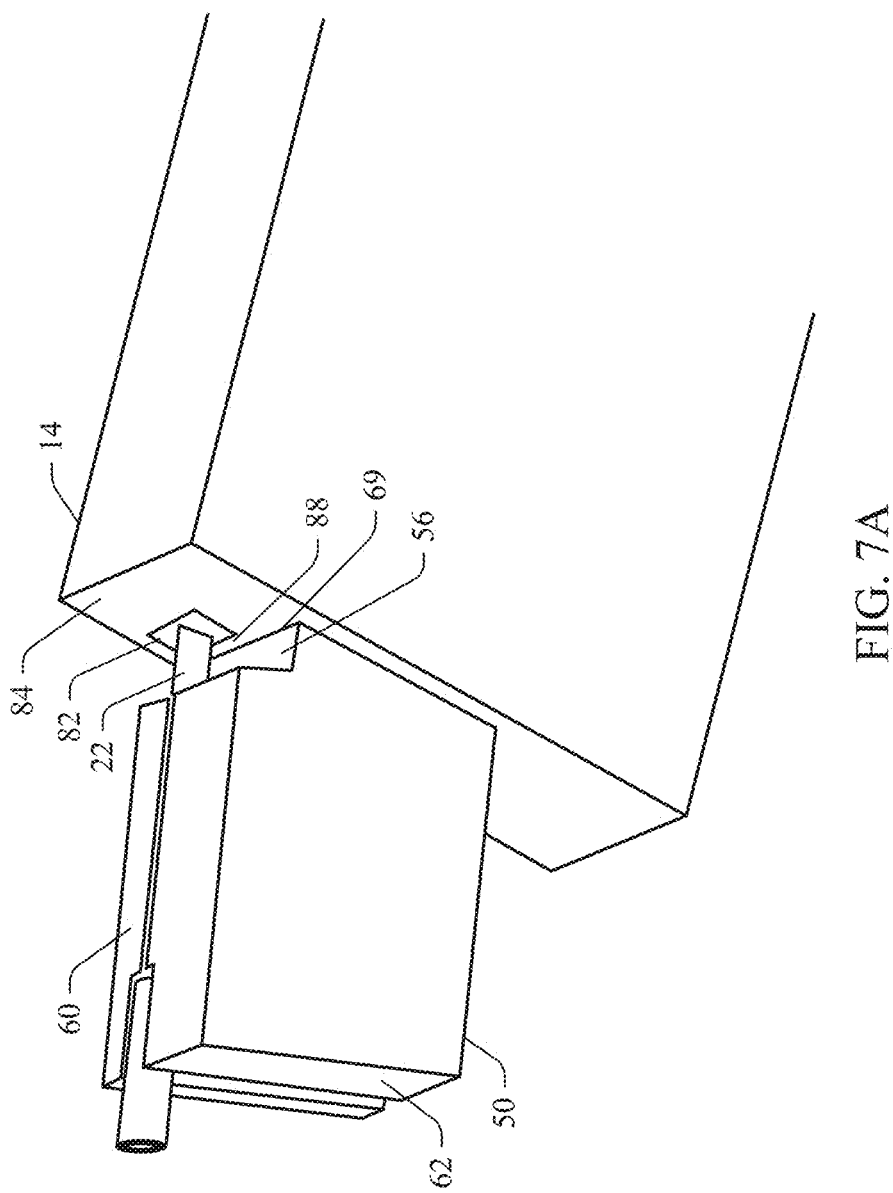

HOLLOW CORE FIBER PIGTAIL SYSTEM AND METHOD

TECHNICAL FIELD

This disclosure relates generally to a gyroscope, and more specifically to a hollow core fiber pigtail system and method for a hollow core fiber gyroscope.

BACKGROUND

Conventional fiber optic gyroscopes utilize a glass or plastic core fiber to create the looped optic coil. Light is transmitted through each end of the fiber coil and a phase shift between the two light waves can be measured through interferometry. Specifically, due to the Sagnac effect, if the gyroscope is rotated in a given direction, the wave travelling against the direction of rotation experiences a shorter travel path. Thus, a phase shift occurs between the two waves, which can be measured with an interferometer.

Glass core fiber optic gyroscopes, however, have distinct disadvantages. First, the glass in the gyroscope is temperature sensitive. More specifically, if the gyroscope is exposed to changing temperatures, the physical characteristics, such as length, of the glass core fiber changes thereby affecting the operation of the gyroscope. Another disadvantage is that the glass is susceptible to the environment in space. In space the glass is exposed to radiation, magnetic fields, etc. that also affects the physical characteristics of the glass. More specifically, the space elements cause the glass core to twist, thereby affecting the operation of the gyroscope.

SUMMARY

The following presents a simplified summary in order to provide a basic understanding of the subject disclosure. This summary is not an extensive overview of the subject disclosure. It is not intended to identify key/critical elements or to delineate the scope of the subject disclosure. Its sole purpose is to present some concepts of the subject disclosure in a simplified form as a prelude to the more detailed description that is presented later.

One example of the subject disclosure includes a sensing system that includes an electronic device having at least one input port and a plurality of output ports, a hollow core sensing coil having opposite distal ends attached to the plurality of output ports and that receive light waves from a light source via the electronic device, and an adapter configured to pigtail each of the opposite distal ends of the hollow core fiber to the plurality of output ports. The adapter includes an attachment face, wherein an end surface of each of the opposite distal ends of the hollow core sensing coil are angled at a predetermined angle that minimizes optical power loss when the light waves propagate from the plurality of output ports to the hollow core sensing coil. The attachment face is angled at the same predetermined angle as the end surface of the opposite distal ends of the hollow core sensing coil with respect to a vertical axis of the adapter.

Another example of the subject disclosure includes a hollow core fiber optic gyroscope. The gyroscope includes a light source and a multifunction integrated optic chip (MIOC) that receives light waves from the light source where the MIOC including a plurality of output ports. The gyroscope further includes a hollow core coil having opposite distal ends attached to the plurality of output ports where the opposite distal ends have end surfaces oriented at a predetermined angle with respect to a vertical axis of the MIOC. An interface is provided that is configured to pigtail each of the opposite distal ends of the hollow core coil to the plurality of output ports where the interface includes an angled attachment face that attaches to a mounting surface on the MIOC. The predetermined angle is based on minimizing optical power loss between the MIOC and the hollow core coil when the light waves propagate from the plurality of output ports to the hollow core coil.

Still another example of the subject disclosure includes a method of preparing a fiber adapter for use in a fiber optic gyroscope. The method includes providing a sensing coil comprised of a hollow core fiber having opposite distal ends and determining an initial angle of end surfaces of each of the opposite distal ends. The method further includes performing tests and measuring a power output of an electronic device, determining an optimum angle of the end surfaces based on optical power loss between the electronic device and the hollow core fiber, and polishing an angled attachment face of a fiber adapter to obtain the optimum angle of the angled attachment face based on the measurements of the power output. The method still further includes cleaving the end surface of the opposite distal ends to eliminate gaps between the end surfaces and output ports of the electronic device, and pigtailing the opposite distal ends to the output ports of the electronic device.

BRIEF DESCRIPTION OF THE DRAWINGS

The accompanying drawings, which are incorporated in and constitute a part of the specification, illustrate various systems, methods, and other examples of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

FIGS. 7A and 7B are perspective and side views respectively of the fiber adapter attached to an electronic device illustrating attachment of the hollow core fiber to the electronic device.

DETAILED DESCRIPTION

Figure 1:
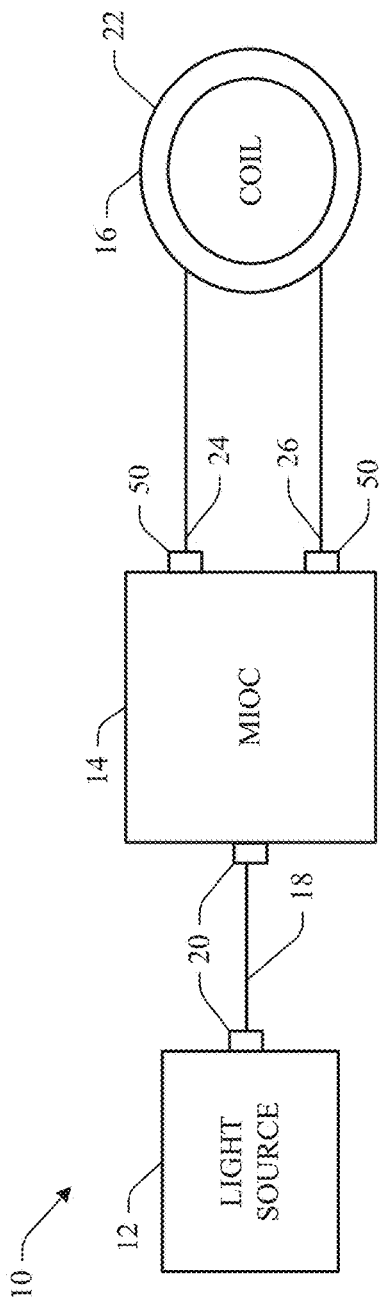
FIG. 1 is an illustration of an overall view of an example sensing system using a hollow core fiber.

Disclosed herein is an example system and method to pigtail a hollow core optical fiber directly (direct pigtailing)

onto a port (e.g., electrode) of an electronic device for a sensing system, such as but not limited to a hollow core fiber optic gyroscope while minimizing optical power loss. Utilizing a hollow core optical fiber for fiber optic gyroscopes overcomes the aforementioned disadvantages. More specifically, hollow core fibers are not constrained like glass core fibers when exposed to temperature change or a harsh environment. In other words, the intensity of the propagating light through the glass is constrained by the physical limitations of the glass. On the other hand, hollow core fibers overcome these constraints by allowing the light to travel through air as opposed to glass.

Up until the development of the subject disclosure, however, hollow core fiber optic gyroscopes were not practical because there was no device, system, or method available to pigtail the hollow core optical fiber to a port of a device associated with the gyroscope, such as a multi-functional integrated optical chip (MIOC). Conventional glass core fiber optic gyroscopes can be easily spliced together or pigtailed to a device due to the available surface area of the glass core. Hollow core fibers, however, have a reduced surface area and are thus, more difficult to join without experiencing high optical power loss. The subject disclosure overcomes this issue by providing a fiber interface having a bonding surface that allows for direct pigtail coupling (direct pigtailing) of the hollow core optical fiber to the port of the device (e.g., MIOC) while minimizing optical power loss thus, paving the way for the development of hollow core fiber optic gyroscopes.

Direct pigtailing entails attaching the hollow core fiber directly to the port of the device, such as the MIOC. For example, the MIOC can be built on a crystal substrate or waveguide of lithium niobate (LiNbO3) material or any other non-isotropic material suitable for integrated-optic waveguides. The MIOC includes ports that provide an external connection to the waveguide. Thus, in direct pigtailing the hollow core fiber is directly attached to the port (e.g., directly to the waveguide of lithium niobate) without the need for splicing. On the other hand, indirect pigtailing requires splicing of the fiber, which is very difficult using a hollow core fiber without experiencing a large loss in optical power.

In addition, the subject disclosure overcomes the need for using an index matching adhesive (e.g., epoxy). When attaching a conventional glass core fiber to a device, an index matching adhesive is used that has the same refractive properties of the glass core. Thus, the light only had to propagate between two different mediums; 1) the glass core/adhesive and 2) the MIOC crystal substrate waveguide. As such, the optical power loss was low. Using an adhesive with a hollow core fiber, however, creates three mediums; 1) air due to the hollow core, 2) the adhesive, and 3) the MIOC crystal substrate waveguide. Thus, the propagating light is refracted twice (as opposed to once using the glass core), which creates a large loss in optical power. As will be described below, the fiber adapter prevents the adhesive from contacting the hollow fiber core therefore, eliminating one of the mediums and reducing the optical power loss. In addition, a stronger adhesive may be used since the adhesive no longer interferes with the hollow core fiber.

Referring now to the drawings, FIG. 1 is a block diagram of an example hollow core (HC) sensing system 10, such as but not limited to an HC fiber optic gyroscope. The configuration and arrangement of the sensing system 10 is for illustrative purposes only and is not intended to limit the scope of the subject disclosure. The sensing system 10 includes a light source 12, an electronic (electro-optic) device 14, such as but not limited to a multi-functional integrated optical chip (MIOC), a coil 16, and a fiber adapter/interface 50 that couples the coil 16 to the MIOC 14.

The light source 12 can be a light source having a low degree of coherence, such as but not limited to a superluminescent diode (SLD) light source. Single mode fibers (e.g., glass core fibers) 18 provide a connection from the light source 12 to the MIOC 14. The single mode fibers 18 are attached to output ports of the light source 12 and to input ports of the MIOC 14 via pigtail coupling connections 20. The MIOC 14 may comprise any of a number of commercially available optical circuit devices having a birefringent crystal substrate or waveguide. As mentioned above, the MIOC 14 can be built on a crystal substrate or an internal waveguide of lithium niobate (LiNbO3) material or any other non-isotropic material suitable for integrated-optic waveguides. In one example, the MIOC 14 includes two ports that provide an external connection to the internal waveguide.

Figure 2:
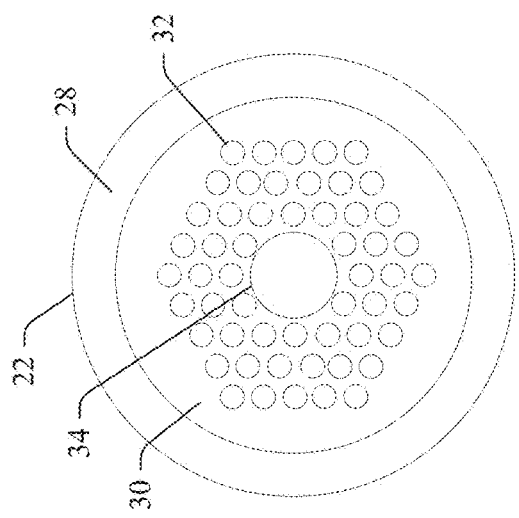
FIG. 2 is a cross-section view of an example hollow core fiber.

Referring to FIGS. 1 and 2, the coil 16 is a sensing coil comprised of a hollow core fiber 22 that includes opposite distal ends (first end and second end) 24, 26. Both the first and second ends 24, 26 are coupled to ports on the device 14 via separate fiber adapters 50 and both receive light from the light source 12 via the device 14. One example of a hollow core fiber (also referred to as photonic bandgap fiber) 22 is illustrated in FIG. 2. The hollow core fiber 22 includes an outer jacket 28 and cladding 30. Multiple air channels defined in the cladding 30 extend a length of the fiber 22 and are comprised of multiple air holes 32 and a hollow central air core 34. Hollow core fibers can be easily bent and coiled as compared to glass core fibers, which makes it particularly suitable for fiber optic gyroscope applications. In addition, light propagates through the air channels, guided by the wall of the air channels, at speeds higher than glass core fibers. The cladding 30 may be made from a glass material, such as but not limited to silica.

Figure 3:
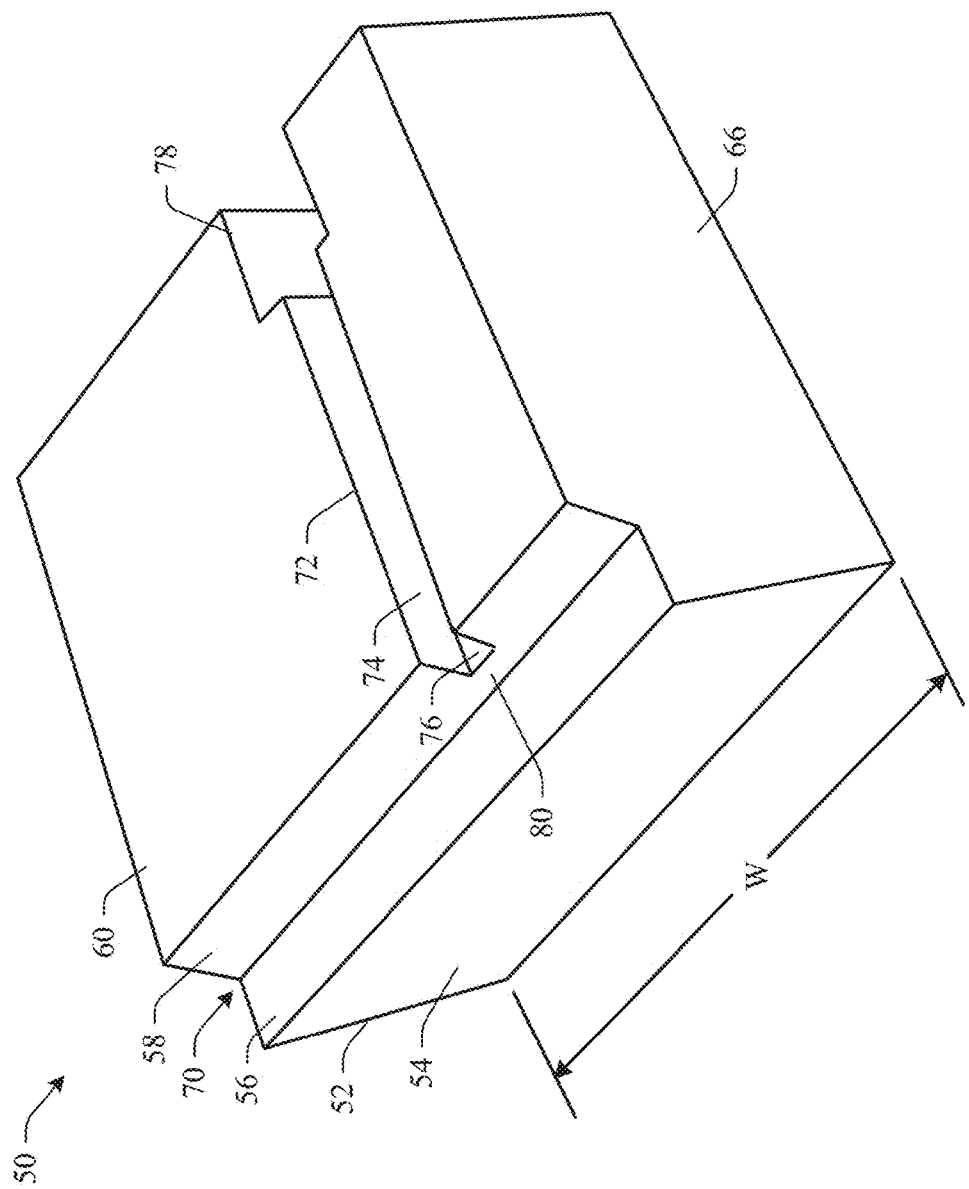
FIGS. 3 and 4 are top perspective opposite end views of an example fiber adapter utilized in a direct pigtailing process.
Figure 4:
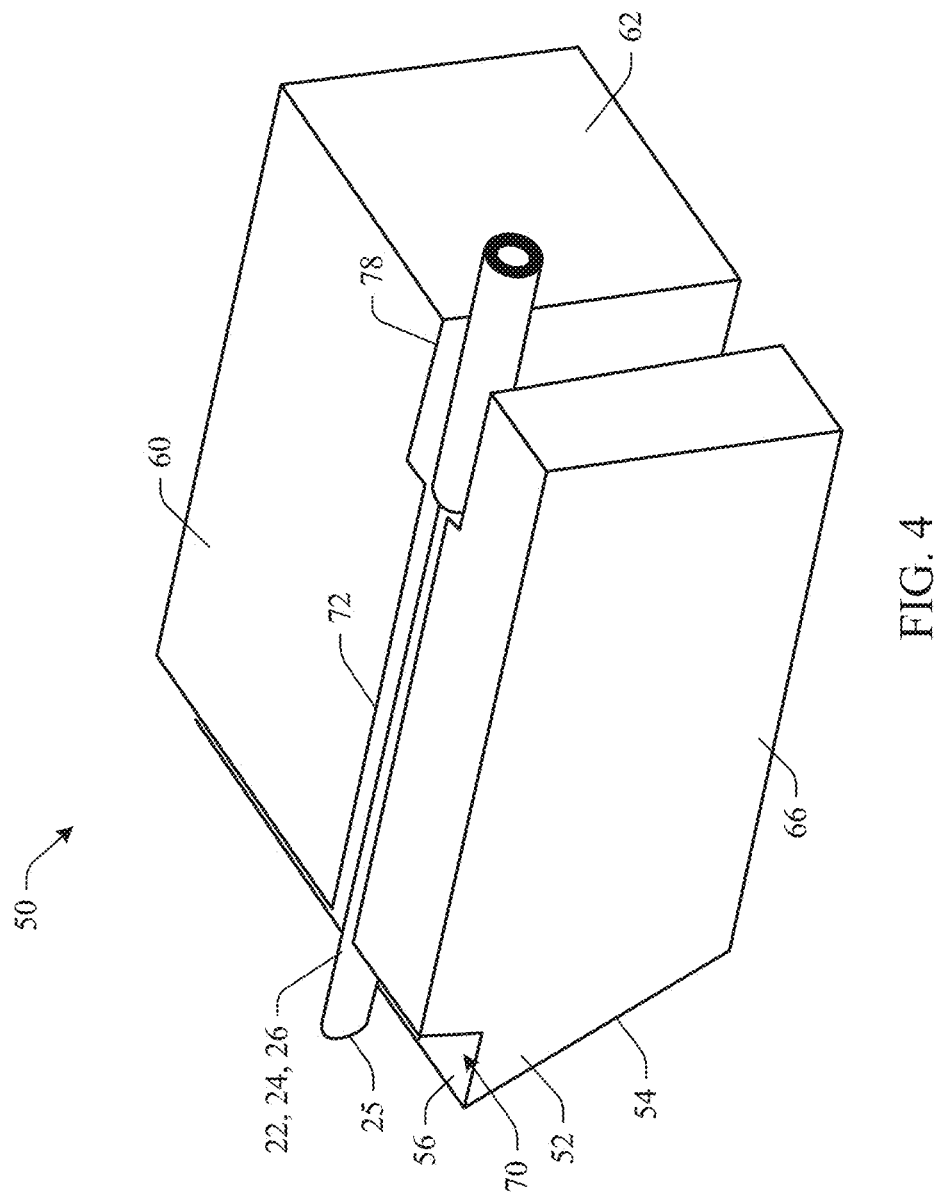

FIGS. 3 and 4 are perspective views of the fiber adapter 50 that couples the hollow core fiber 22 to a port (electrode) of the device 14. The fiber adapter 50 has essentially a block type shape and includes an interface side comprised of a triangular portion 52 having a first (attachment) face 54 and a second (recess) face 56. The interface side further includes a third (extension) face 58 essentially perpendicular to the second face 56. The fiber adapter 50 further includes a fourth (slotted) face 60 extending from the extension face 58 in a direction away from the first face 54 and essentially parallel to the recess face 56. The fiber adapter 50 further includes a fifth (rear) face 62 opposite the first face 52, a sixth (bottom) face 64 opposite that of the fourth face 60, and a pair of side walls 66.

Referring to FIGS. 3-6, a proximate edge 68 of the first face 54 intersects with the sixth face 64. The first face 54 extends from the sixth face 64 at an angle θ with respect to a vertical axis A of the fiber adapter 50, where the vertical axis A is parallel to the third face 58. Thus, the first face 54 is angled at the angle θ with respect to the third face 58. In addition, as shown in FIG. 7B, when the fiber adapter 50 is attached to the device 14, the vertical axis A of the fiber adapter 50 is angled at the angle θ with respect to a vertical axis A1 of the device 14. The second face 56 extends from a distal edge 69 of the first face 54 toward the fifth face 62. A configuration of the second and third faces 56, 58 forms an approximate 90 degree buffer or recess 70 that may extend the entire width W of the fiber adapter 50 or said another way, from one side wall 66 to the opposite side wall 66, as shown in FIG. 3. Alternatively, the recess 70 may extend only a portion of the width W in an area adjacent to a channel 72 subsequently described.

Figure 5:
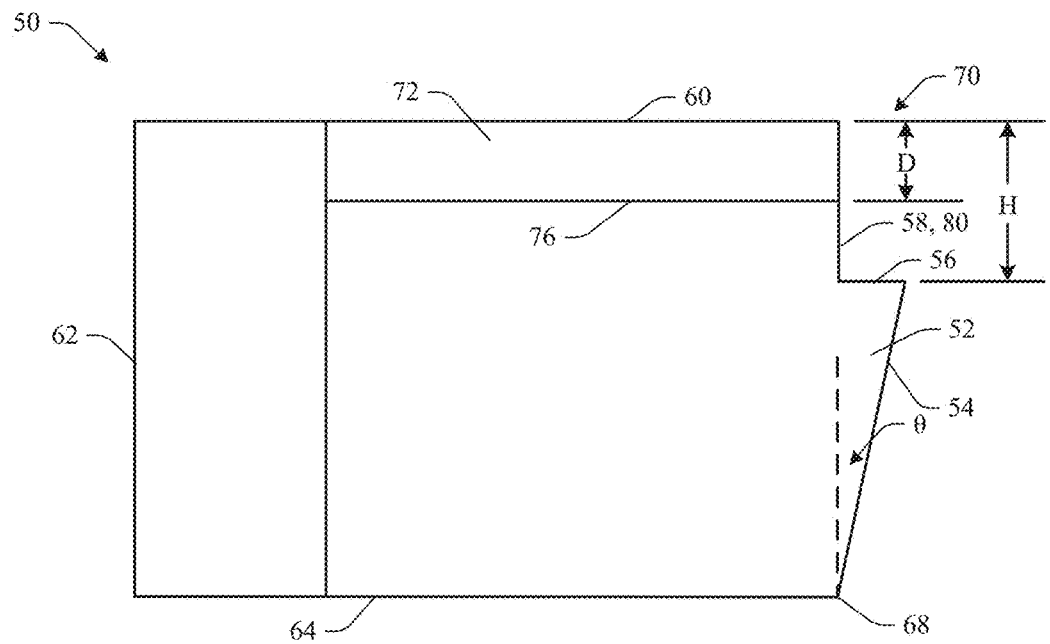
FIGS. 5 and 6 are side views of the fiber adapter without the hollow core fiber and with the hollow core fiber respectively.

The channel 72 having side walls 74 and a support surface 76 is defined in the fourth face 60. The channel 72 extends essentially parallel to the side walls 66 from third face 58 to the fifth face 62 and is configured to receive the hollow core fiber 22. The channel 72 may vary in width based on a diameter of the hollow core fiber 22. For example, as illustrated in the figures, the channel 72 includes an expanded portion 78 disposed near the fifth face 62 that can accommodate a splicing junction, for example, to splice together different sized fibers. As shown in FIGS. 3 and 4, the expanded portion 78 can extend along the fifth face 62 from the fourth face 60 to the sixth face 64. A depth D of the channel 72 (excluding the expanded portion 78) is less than a height H of the third face 58 such that a gap 80 remains between the support surface 76 of the channel 72 and the second face 56, as illustrated in FIG. 5.

Figure 6:
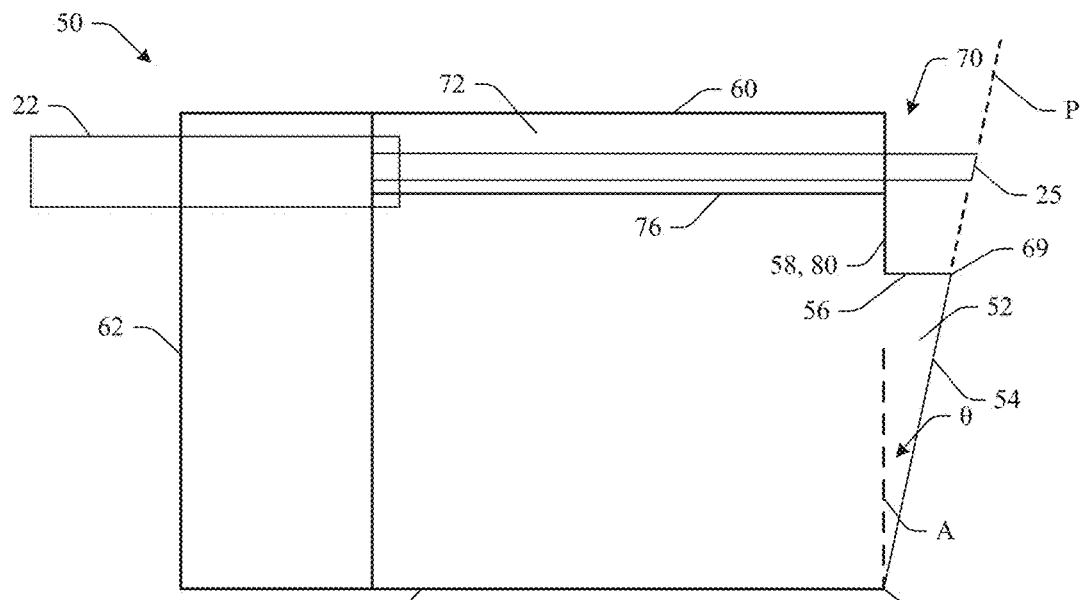
Figure 7B:
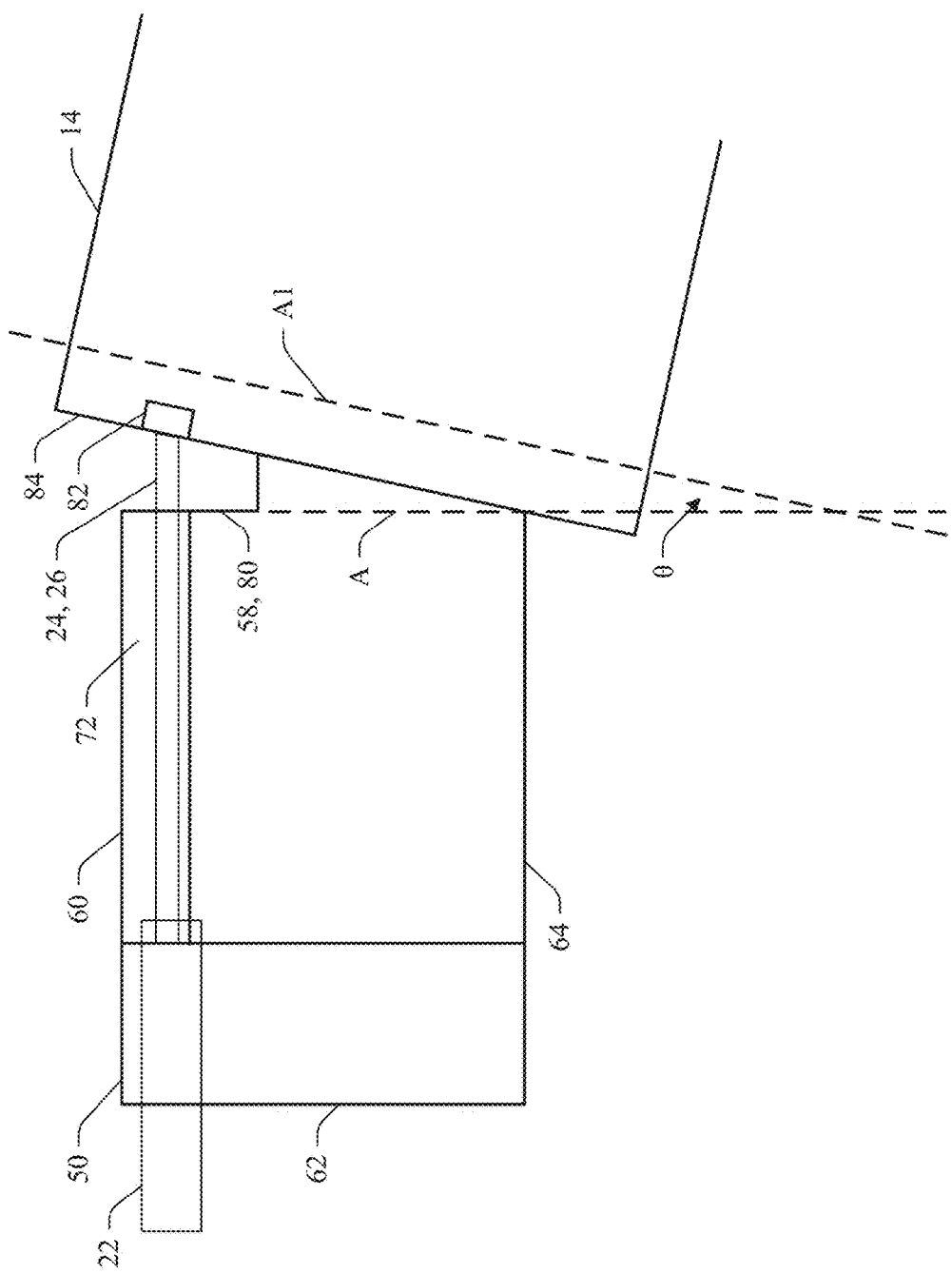

Still referring to FIGS. 3-6, the first and second ends 24, 26 of the hollow core fiber 22 reside in the channel 72 of separate fiber adapters 50. For simplicity, explanation of the disposition of the hollow core fiber 22 in the fiber adapter 50 and attachment of the hollow core fiber to the device 14 will be described with reference to the first end 24. Disposing and attaching the second end 26 is performed in a similar manner. The first end 24 of the hollow core fiber 22 is bonded in the channel 72 using a bonding agent (e.g., epoxy). The first end 24 extends into the recess 70 beyond the third face 58 toward a plane P defined by an extension of the first face 54. Based on the type of device 14 and the configuration of the port of the device 14, the first end 24 may extend short of the plane P, may extend to the plane P (may be flush with the plane P as shown in FIG. 6), or beyond the plane P.

An orientation of an end surface 25 of the first end 24 is angled at a predetermined angle with respect to the vertical axis A of the fiber adapter 50 at the same angle θ as the first face 54. The angle θ controls an alignment of an optical axis of the hollow core optical fiber 22 relative to an optical axis of the device 14 when the angled surface 25 is bonded to the port of the device 14. In order to determine the optimum angle with the minimal optical power loss, Snell's Law is used to determine a relationship between the angles incidence and refraction between two mediums (e.g., air and MIOC crystal substrate waveguide) to determine preliminary initial angles of the end surface 25. Marcuse Splice Loss Equation is then used to estimate optical power loss between the hollow core fiber 22 and the port of the device 14 based on the initial angles. Several Design of Experiments (DOE) (tests) are then performed to determine the optical power loss of the light at each initial angle as the light propagates from the device 14 to the hollow core fiber 22. The initial angle having the minimum optical power loss is the optimum angle (angle θ) of the end surface 25 of the hollow core fiber 22 and hence, the first face 54. Tests were performed based on this system and process and experimental data indicated that the optical power loss using the subject disclosure was approximately 5.83 dB, which is very comparable to the standard Fibercore fiber pigtail performance of 5.44 dB.

Figure 8:
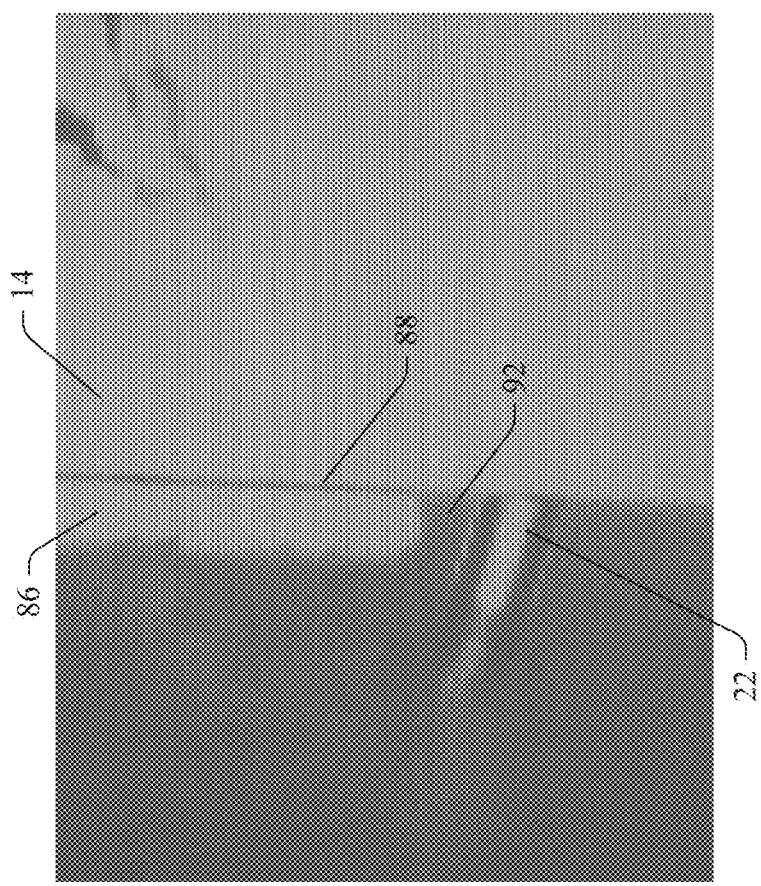
FIG. 8 is a microscopic view illustrating a separation between an adhesive and the hollow core fiber when the fiber adaptor is attached to the electronic device.

Referring to FIGS. 7A, 7B, and 8, FIGS. 7A and 7B are example perspective and side view illustrations of the hollow core fiber 22 pigtailed to a port (electrode) 82 of the device 14 due to the attachment of the fiber adapter 50 attached to a mounting surface 84 of the device 14. When the fiber adapter 50 is attached to the device 14, the arrangement of the angled first face 54, the recess 70, the channel 72, and the gap 80 prevent an adhesive 86 from flowing or wicking to the hollow core fiber 22. Specifically, the first face 54 is coated with the adhesive 86, such as but not limited epoxy, and attached to the face 84 of the device 14. The angle of the first face 54 causes the third face 58 to be spaced from the face 84 of the device 14, thereby creating separation between the face 84 of the device 14 and the third face 58 of the fiber adapter 50. In addition, the gap 80 due to the depth of the channel 72 and the height of the third face 58 causes the hollow core fiber 22 to be spaced from the second face 56, which in turn creates a gap 88 between the distal edge 69 of the first face 54 and the hollow core fiber 22. Thus, upon attachment, when the adhesive 86 flows beyond the distal edge 69 of the first face 54 due to compression, the adhesive 86 flows into the gap 88. The gap 88, however, creates enough separation between the distal edge 69 and the hollow core fiber 22 such that the adhesive 86 does not reach the hollow core fiber 22, as indicated by the separation 92 illustrated in the microscopic view in FIG. 8. Thus, the adhesive 86 does not interfere with the light as the light propagates from the device 14 to the hollow core fiber 22.

Figure 9:
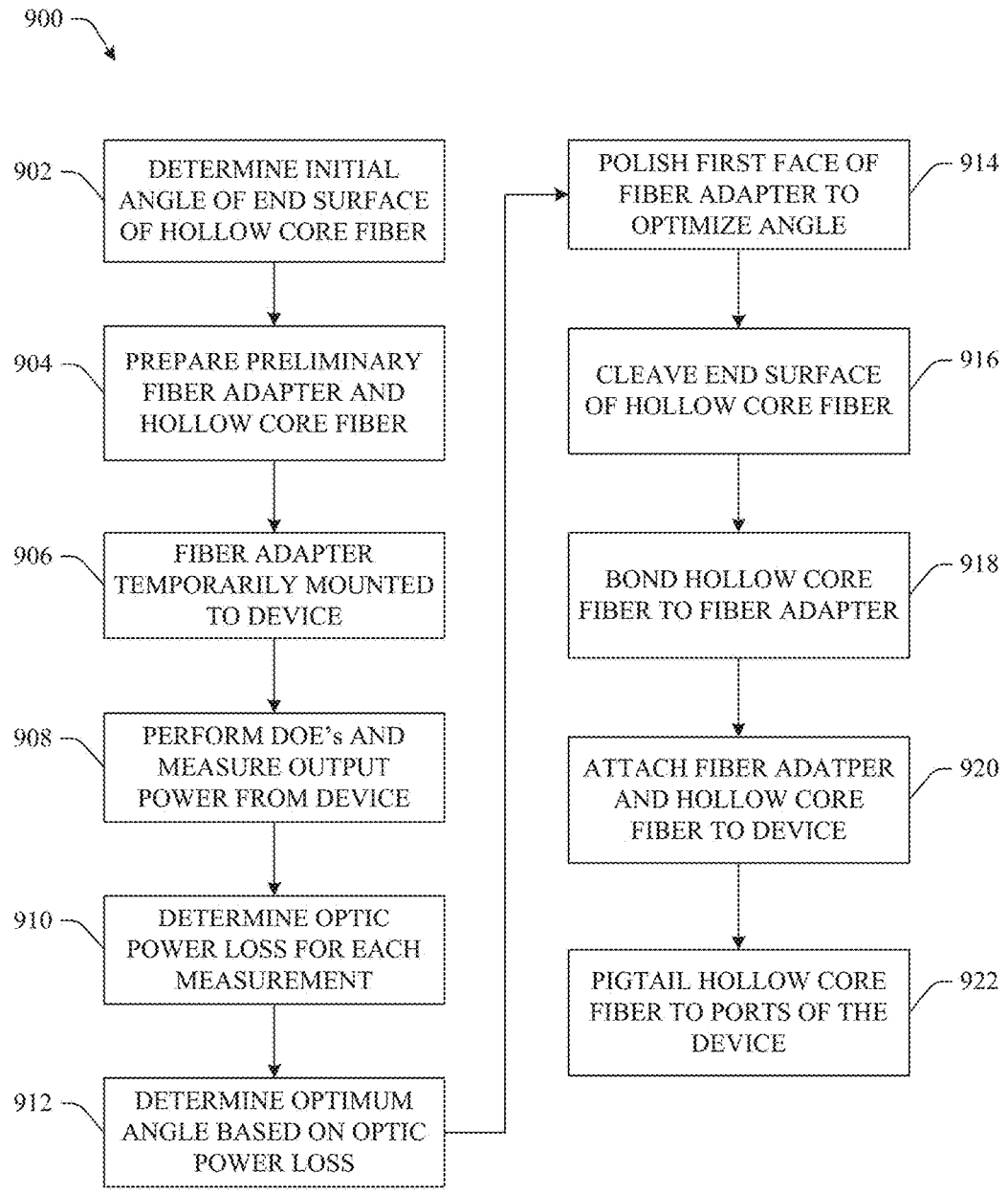
FIG. 9 is an example method of preparing the fiber adapter and the hollow core fiber for attachment to the electronic device.

In view of the foregoing structural and functional features described above, a method shown herein, e.g., in the form of flow charts, in accordance with various aspects of the present disclosure will be better appreciated with reference to FIG. 9. While, for purposes of simplicity of explanation, the method of FIG. 9 is shown and described as executing serially, it is to be understood and appreciated that the present disclosure is not limited by the illustrated order, as some aspects could, in accordance with the present disclosure occur in different orders and/or concurrently with other aspects from that shown and described herein. Moreover, not all illustrated features may be required to implement a method in accordance with an aspect of the present disclosure.

Figure 10:
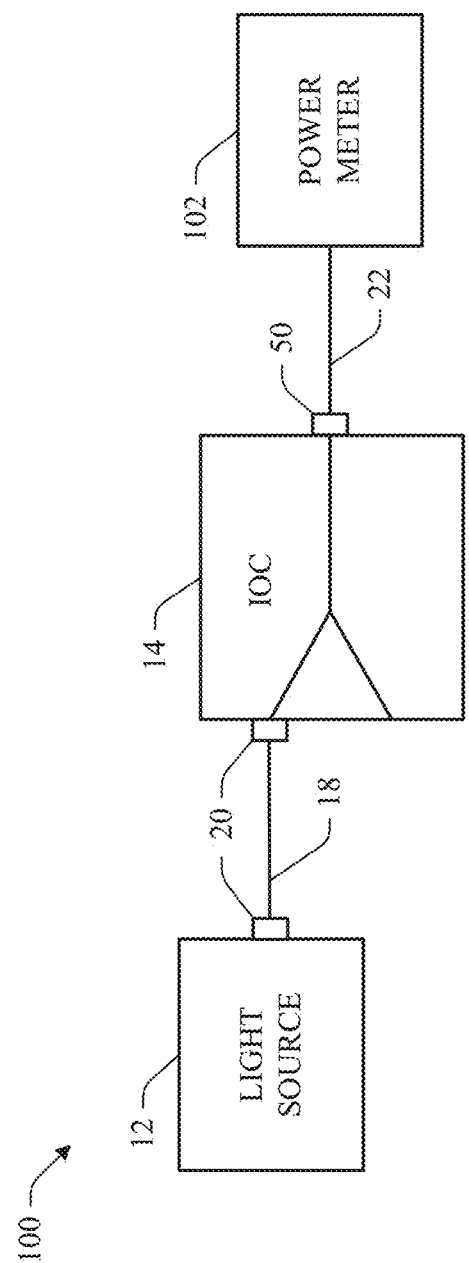
FIG. 10 is an example illustration to measure output power from the electronic device (e.g., an Integrated Optical Chip (IOC)) to determine optical power loss during the preparation of the fiber adapter and the hollow core fiber.

Referring to FIGS. 9 and 10, FIG. 9 is an example method 900 of preparing a fiber adapter 14 and the hollow core fiber 22 as described herein and attaching the fiber adapter 14 to a device (e.g., MIOC). FIG. 10 is an example circuit 100 used to determine quality of the fiber adapter 50 at a component level. The circuit 100 includes the light source 12 attached to the device 14 as described above. The output from the device 14 via the fiber adapter 50 is measured with a power meter 102. The optical power loss can be determined from the measurements and the angle of the end surface 25 of the hollow core fiber can be adjusted to determine the minimum optical power loss.

Thus, referring to FIG. 9, at 902, an initial angle of the end surface 25 of the hollow core fiber 22 is determined as described above using Snell's Law and the Marcuse Splice Loss Equation. At 904, a preliminary fiber adapter 50 with the angled attachment face 54 and the end surface of the hollow core 22 fiber are configured using the initial angle. At 906, the fiber adapter 50 is temporarily mounted to the device 14. At 908, several DOE's (tests) are performed and an output power from the device 14 is measured with the power meter 102. At 910, the optical power loss between the device 14 and the hollow core fiber 22 is determined for each measurement based on the input power from the light source 12 and the measured output power. At 912, the optimum angle with the minimum optical power loss is determined for the end surface 25 of the hollow core fiber 22. At 914, the fiber adapter 50 is removed from the device 14 and based on the measurements the first surface 54 of the fiber adapter 50 is polished to the optimum angle θ. At 916, the end surface 25 of the hollow core fiber 22 is cleaved to the optimum angle θ to eliminate any gaps between the end surface 25 and the port 82 of the device 14. At 918, the first end 24 of the hollow core fiber 22 is bonded to the fiber adapter 50 as disclosed herein. At 920, an adhesive is applied to the attachment face 54 and the fiber adapter 50 is attached to the mounting surface of the device 14. At 922, the opposite distal ends 24, 26 of the hollow core fiber 22 are pigtailed to the ports 82 of the device 14 as described herein.

The fiber adapter/pigtail system and process disclosed herein minimizes fiber pigtail loss by reducing light interference from an electronic device to the hollow core fiber. Preparation time to prepare the fiber adatpter and hollow core fiber is similar in preparation time to prepare a conventional pigtail using a glass core fiber. In addition, the subject disclosure was described using single mode fibers, however, the subject disclosure can be used on other fibers, such as but not limited to polarization mainating (PM) fibers.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A sensing system comprising:
   an electronic device having at least one input port, a plurality of output ports and a mounting surface;
   a hollow core sensing coil having opposite distal ends attached to the plurality of output ports and that receive light waves from a light source via the electronic device, the opposite distal ends including an end surface that is angled at a predetermined angle that minimizes optical power loss when the light waves propagate from the plurality of output ports to the hollow core sensing coil; and
   an adapter configured to pigtail each of the opposite distal ends of the hollow core fiber to the plurality of output ports, the adapter including an attachment face that is angled at the same predetermined angle as the end surface of the opposite distal ends of the hollow core sensing coil with respect to a vertical axis of the adapter, the attachment face being attached to the mounting surface of the electronic device.

2. The sensing system of claim 1, wherein the adapter further includes a recess having a recess face and an extension face, wherein the recess face extends from a distal end of the attachment face toward the extension face and the extension face extends essentially perpendicular from the recess face.

3. The sensing system of claim 2, wherein the adapter further includes a slotted face having a channel defined therein and wherein the channel is adapted to receive one of the opposite distal ends of the hollow core sensing coil.

4. The sensing system of claim 3, wherein each of the opposite distal ends of the hollow core sensing coil extends from the channel into the recess for attachment to one of the plurality of output ports.

5. The sensing system of claim 4, wherein the opposite distal ends extend into the recess whereby the end surface is flush with a plane defined by an extension of the attachment face.

6. The sensing system of claim 1, wherein the hollow core sensing coil is a hollow core fiber optic gyroscope and the electronic device is a multifunction integrated optic chip.

7. A hollow core fiber optic gyroscope comprising:
   a light source;
   a multifunction integrated optic chip (MIOC) that receives light waves from the light source, the MIOC including a plurality of output ports;
   a hollow core coil having opposite distal ends attached to the plurality of output ports, the opposite distal ends having end surfaces oriented at a predetermined angle with respect to a vertical axis of the MIOC; and
   an interface configured to pigtail each of the opposite distal ends of the hollow core coil to the plurality of output ports, the interface including an angled attachment face that attaches to a mounting surface on the MIOC,
   wherein the predetermined angle is based on minimizing optical power loss between the MIOC and the hollow core coil when the light waves propagate from the plurality of output ports to the hollow core coil.

8. The hollow core fiber optic gyroscope of claim 7, wherein when the angled attachment face is attached to the mounting surface of the MIOC, a vertical axis of the interface is disposed at the predetermined angle with respect to the vertical axis of the MIOC.

9. The hollow core fiber optic gyroscope of claim 8, wherein the interface further includes a recess having a recess face and an extension face, wherein the recess face extends from a distal end of the attachment face toward the extension face and the extension face extends essentially perpendicular from the recess face.

10. The hollow core fiber optic gyroscope of claim 9, wherein the interface further includes a slotted face having a channel defined therein and wherein the channel is adapted to receive one of the opposite distal ends of the hollow core sensing coil.

11. The hollow core fiber optic gyroscope of claim 10, wherein each of the opposite distal ends of the hollow core coil extends from the channel into the recess for attachment to one of the plurality of output ports.

12. The hollow core fiber optic gyroscope of claim 11, wherein the opposite distal ends extend into the recess whereby the end surface is flush with a plane defined by an extension of the attachment face.

13. A method of preparing a fiber adapter for use in a fiber optic gyroscope, the method comprising:
   providing a sensing coil comprised of a hollow core fiber having opposite distal ends;
   determining an initial angle of end surfaces of each of the opposite distal ends;
   performing tests and measuring a power output of an electronic device;
   determining an optimum angle of the end surfaces based on optical power loss between the electronic device and the hollow core fiber;
   polishing an angled attachment face of a fiber adapter to obtain the optimum angle of the angled attachment face based on the measurements of the power output;
   cleaving the end surface of the opposite distal ends to eliminate gaps between the end surfaces and output ports of the electronic device; and
   pigtailing the opposite distal ends to the output ports of the electronic device.

14. The method of claim 13, wherein prior to performing tests and measuring a power output of an electronic device, the method further comprising preparing a fiber adapter having an angled attachment face and temporarily mounting the fiber adapter to a mounting face of the electronic device.

15. The method of claim 14, wherein prior to determining an optimum angle of the end surfaces based on optical power loss between the electronic device and the hollow core fiber, the method further comprising determining the optical power loss for each measurement.

16. The method of claim 15, wherein prior to pigtailing the opposite distal ends to the output ports of the electronic device, the method further comprising bonding the opposite distal ends into a channel defined in the fiber adapter and mounting the fiber adapter to the mounting surface of the electronic device.

17. The method of claim 13, wherein the angled attachment face of the fiber adapter has the same angle orientation as the end surfaces of the opposite distal ends with respect to a vertical axis of the fiber adapter.

18. The method of claim 17, wherein when the fiber adapter is attached to the electronic device, the vertical axis of the fiber adapter is disposed at the optimum angle with respect to a vertical axis of the electronic device.

19. The method of claim 13, wherein the optimum angle is an angle of the end surfaces of each of the opposite distal ends with respect to a vertical axis of the fiber adapter that emits a minimum optical power loss as light waves from a light source propagate from the electronic device to the hollow core fiber.

20. The method of claim 13, wherein the electronic device is a Multifunction Integrated Optic Chip (MIOC).

\* \* \* \* \*